United States Patent [19]

Henderson

[11] 4,396,342

[45] Aug. 2, 1983

[54] SWINGABLY SUPPORTED PUSHER ACTUATOR FOR REFUSE TRANSPORTING VEHICLE

[75] Inventor: Donald J. Henderson, Covina, Calif.

[73] Assignee: Dempster Systems Inc., Knoxville, Tenn.

[21] Appl. No.: 189,141

[22] Filed: Sep. 22, 1980

[51] Int. Cl.[3] ........................ B65F 1/12; F16H 21/44
[52] U.S. Cl. .................................... 414/511; 414/517
[58] Field of Search ...................... 414/511, 517, 509; 100/274, 275, 276, 277

[56] References Cited

U.S. PATENT DOCUMENTS 3,901,394 8/1975 Bowles ............................... 414/511

FOREIGN PATENT DOCUMENTS 52-1817 8/1977 Japan .................................. 414/509

*Primary Examiner*—Robert B. Reeves
*Assistant Examiner*—James Barlow
*Attorney, Agent, or Firm*—Jacox & Meckstroth

[57] ABSTRACT

An actuator is extensible in a first position within a truck receptacle to move a pusher to a primary rearward position in the receptacle; and the actuator is extensible in a second position in the receptacle to move the pusher to a secondary rearward position in the receptacle, said secondary position located closer to a discharge opening than said primary position. Swingable means is provided, and to which the actuator is operatively connected, for swinging that connection to the actuator between the first and second positions.

10 Claims, 8 Drawing Figures

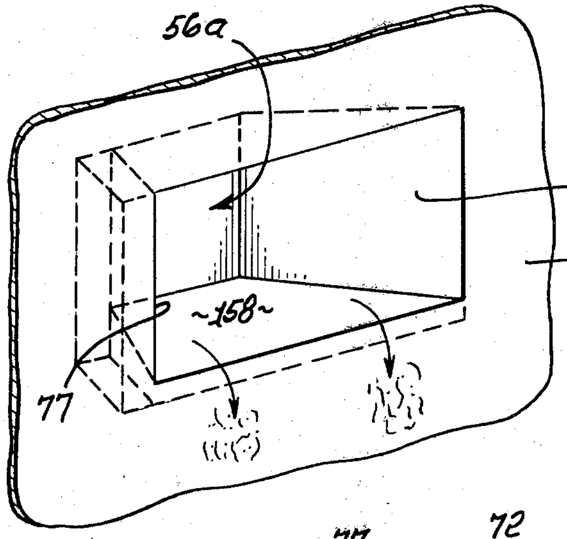
FIG. 4.
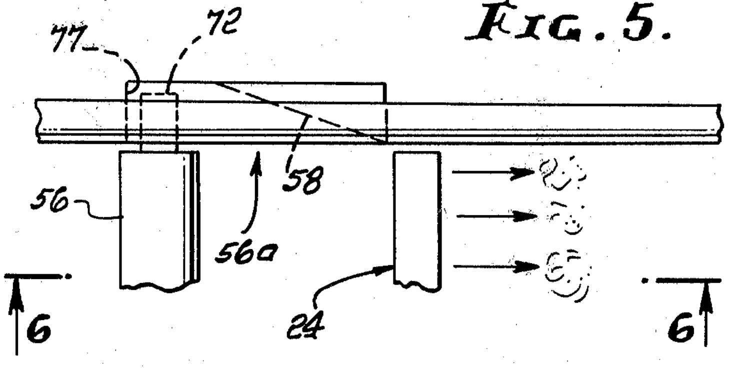
FIG. 5.
FIG. 7.
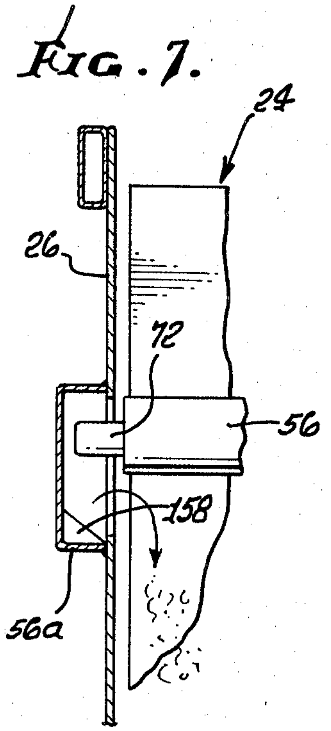
FIG. 6.
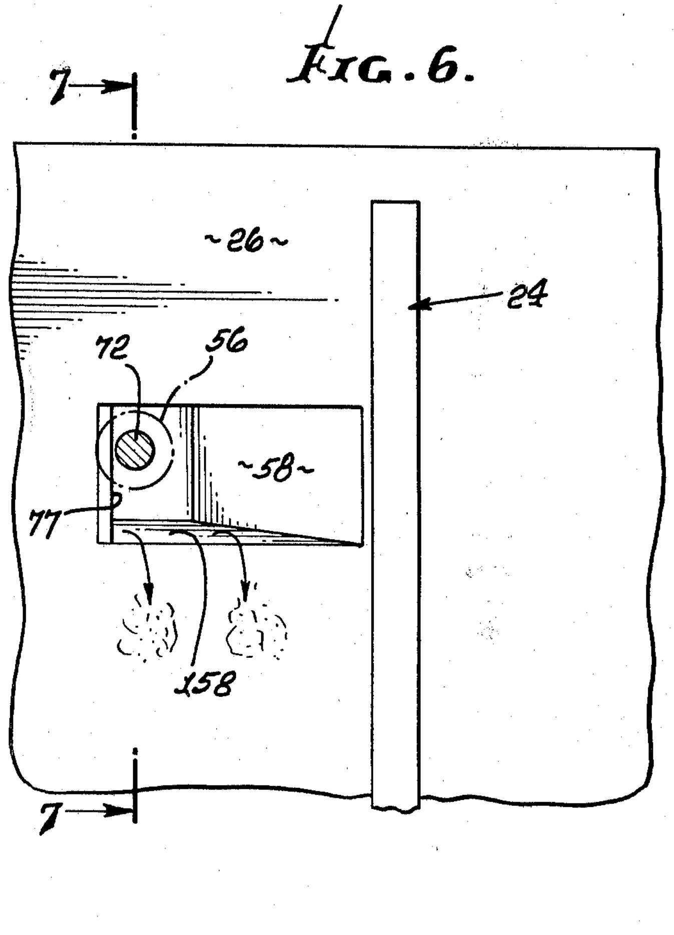

SWINGABLY SUPPORTED PUSHER ACTUATOR FOR REFUSE TRANSPORTING VEHICLE

BACKGROUND OF THE INVENTION

This invention relates generally to self-contained re-fuse handling and transporting apparatus, and more particularly, to a new and improved packing ram for use in such apparatus.

In most large metropolitan areas, refuse is collected from numerous local points and transported to a remote disposal site located some substantial distance from the collection points. Typically, the refuse initially is collected in small containers which are then periodically dumped into a larger receptacle mounted on the bed of a truck for transportation from one collection point to another, and to and from the remote disposal site.

Since the distance between successive collection points is usually relatively short, and the distance between the points of collection and the disposal site is usually relatively large, it is desirable to pack as much refuse as possible into the receptacle before making a trip to the disposal site. One approach to maximizing the amount of refuse which can be picked up is to employ a packing ram inside the receptacle and which compresses the refuse as it is collected.

See for example U.S. Pat. No. 3,901,394. While that ram is of advantage, it can cause a binding problem due to mounting of an anchor frame to the walls of the receptacle, that frame being extensible and retractable as explained in the patent. Accordingly, a simpler means for mounting the anchor frame is needed, so as to avoid the binding problem.

SUMMARY OF THE INVENTION

It is a major object of the present invention to provide a solution to the above problem. Basically, and in accordance with the invention, a swingable means such as a swingable anchor frame is provided to anchor actuator or actuators for the blade (or pusher). The frame is swingable rearwardly to swing its connection to the actuator from a first position relatively forwardly in the receptacle to a second position closer to said discharge opening than said forward position, whereby the actuator is extensible in said first position to move the pusher to a primary rearward position in the receptacle, and the actuator is extensible in said second position to move the pusher to a secondary rearward position in the receptacle, said secondary position located closer to said discharge opening than said primary position.

Further, and as will appear, holder means is provided to hold the swingable frame in its retracted and extended positions to allow actuator operation, to extend and retract the heavy blade or pusher; and a scissors linkage is associated with the swingable frame to retain it against over-swinging in its rearwardmost position.

These and other objects and advantages of the invention, as well as the details of an illustrative embodiment, will be more fully understood from the following description and drawings, in which:

DRAWING DESCRIPTION

FIG. 4 is a perspective view of a pin receiver on a refuse receptacle wall;

FIG. 5 is a top plan view taken in section through the FIG. 4 receiver, showing pin reception;

FIG. 6 is a side elevational view of the FIG. 4 receiver taken on lines 6—6 of FIG. 5 to show blade or pusher travel past the receiver;

FIG. 7 is a view on lines 7—7 of FIG. 6; and

DETAILED DESCRIPTION

Figure 1:
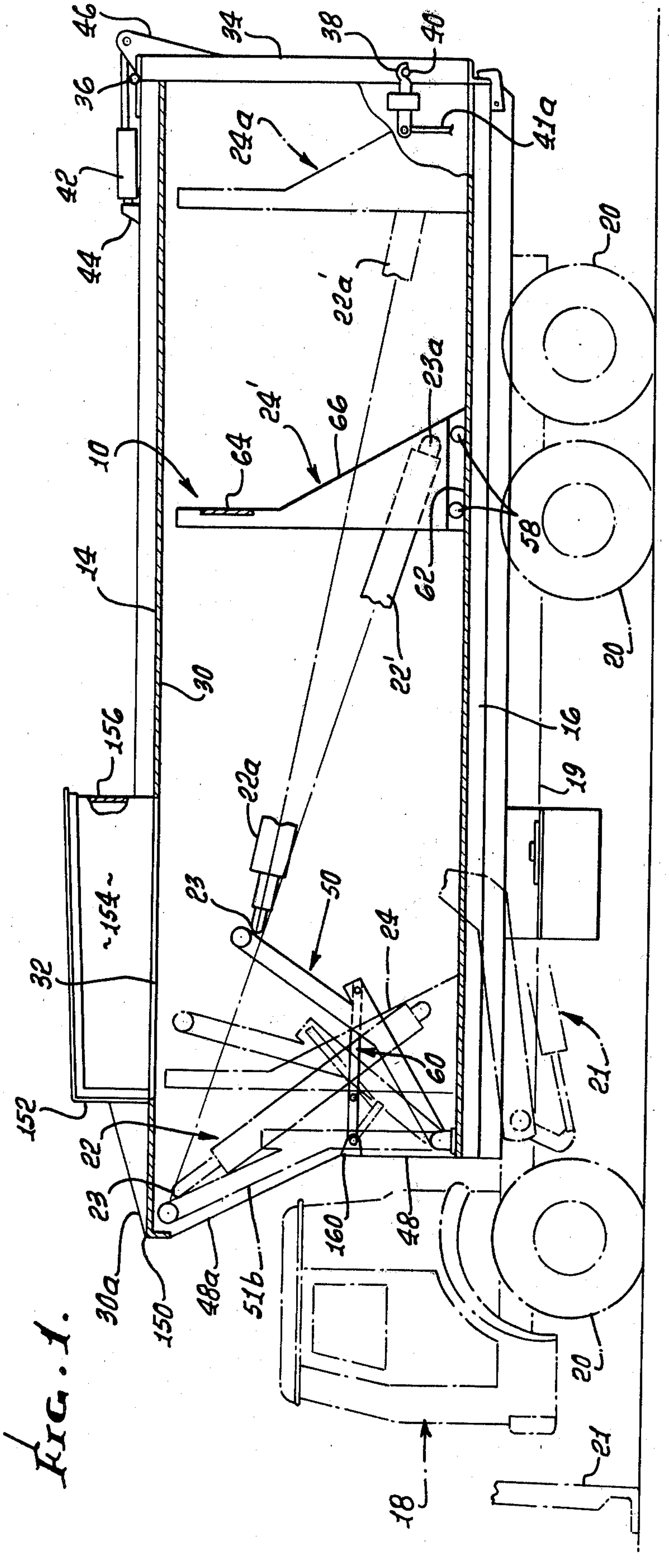
FIG. 1 is a side elevational view, partly in cross section, showing a refuse handling and transporting apparatus having a packing ram or pusher actuable by an actuator carried by swingable frame means.

As shown in the drawings, a pusher or packing ram 10 is mounted inside of an elongated and box-shaped receptacle 14 secured to a bed 16 of a conventional front-loading refuse truck. The truck includes a cab 18, a chassis 19 supported by wheels 20, and an arm assembly 21 for lifting and dumping refuse into the receptacle from small collection containers (not shown). See also U.S. Pat. No. 3,901,394.

The ram includes an extensible, fluid operated packing cylinder or actuator 22 having an anchorage 23 at one end attached to the frame 50 and pivotally attached at the opposite end 23*a* to a vertically disposed packing blade or pusher 24 supported for longitudinal movement inside the receptacle 14 between a retracted position in broken lines adjacent the front of the receptacle, and an extended position 24*a* toward the rear of the receptacle. The receptacle 14 has a rectangular cross-section formed by vertical sides 26, a horizontal bottom 28, and a generally horizontal top 30, a forward portion of the top being open and defining a loading opening 32 through which refuse is dumped into the receptacle.

The rear of the receptacle 14 is normally closed by a door 34 which can be opened to provide a discharge opening through which refuse in the receptacle can be emptied. Herein, the top edge of the door 34 is pivotally attached to the top 30 of the receptacle 14 by a hinge 36, and hooks 38 attached to each of the sides 26 releasably engage latterally projecting pins 40 on the side edges of the door to lock the door in the closed position, the hooks being disengageable from the pins through manual actuation of a handle on one side of the receptacle and coupled by a linkage 41*a* to each hook.

To operate the door 34, a fluid cylinder 42 is pivotally attached at one end to a bracket 44 upstanding from the top 30, and at the other end to a bracket 46 secured to the door. The door 34 is opened by releasing the hooks 38 from engagement with the pins 40 to unlock the door, and then retracting the cylinder 42, to pivot the door upwardly and rearwardly about the hinges 36 to an upwardly raised position. Refuse can then be emptied through the discharge opening by extending the ram 10 to push the refuse from the receptacle 14, thus eliminating the necessity of having a lifting mechanism for the bed 16 to dump the refuse.

The front of the receptacle 14 herein is closed by an upstanding front wall 48 which projects vertically from the bottom 28 to a point approximately halfway up the sides 26, and then is inclined upwardly and forwardly at 48*a* toward the front edge of the top 30. The top 30 extends upwardly and rearwardly at 30*a* from its front edge 150 to a short vertical front wall 152 secured to the front edges of a pair of vertical side plates 154 upstanding from the sides 26 and cooperating with a vertical back wall 156 projecting from the top 30 to define the loading opening 32.

In its fully retracted position, the pusher or blade 24 is forward of the loading opening 32 in the receptacle 14 so that refuse dumped into the receptacle will not fall behind the blade in the front of the receptacle. When a selected amount of refuse has been collected in the receptacle 14, the packing cylinder 22 is actuated to extend the blade 24 and compact the refuse toward the rear of the receptacle, typically by admitting hydraulic fluid at a constant rate to the packing cylinder from a hydraulic fluid supply system (not shown) carried by the truck. After compacting, the packing cylinder 22 is retracted to return the blade 24 to the front of the receptacle 14 preparatory to collecting additional refuse.

As best shown in FIGS. 1, 2, 5, 6, and 7, the blade 24 has a generally rectangular shape as viewed from the end of the receptacle 14, and is dimensioned to substantially fill the cross-sectional area defined by the sides 26, top 30, and bottom 28 of the receptacle. A pair of wheels 58 on each side of the lower portion of the blade 24 support the blade for movement through the receptacle 14 on suitable longitudinal tracks 62 extending the full length of the receptacle and secured to the sides 26 along the bottom 28.

The packing face of the blade 24, that is the portion of the blade facing the rear of the receptacle 14, has a generally vertical upper wall 64 projecting from a downwardly and rearwardly inclined lower wall 66 which functions as a scoop to prevent refuse from bunching up and tending to block movement of the blade during packing. Additionally, the packing face of the blade 24 may have a centrally disposed and rearwardly tapered vertical member which serves to reinforce the blade between the upper and lower walls 64 and 66, and also to deflect refuse laterally during compacting to prevent the refuse from building up in the center of the receptacle 14. See U.S. Pat. No. 3,901,394.

In accordance with an important aspect of the invention, swingable means is provided so as to be operatively connected to the actuator or cylinder 22, for swinging the latter from a first retracted position (shown in broken lines at 22) relatively forwardly in the receptacle 14, to a second and rearwardly extending position (shown at 22*a*) closer to the rear discharge opening. As a result, the actuator is extensible in its first position to position 22′ to move the pusher or blade to a primary rearward position 24′ in the receptacle; and the actuator is subsequently extensible in its second position to position 22*a*′, to move the pusher or blade to a secondary rearward position 24*a* located closer to the discharge opening than its primary rearward position 24′.

Figure 2:
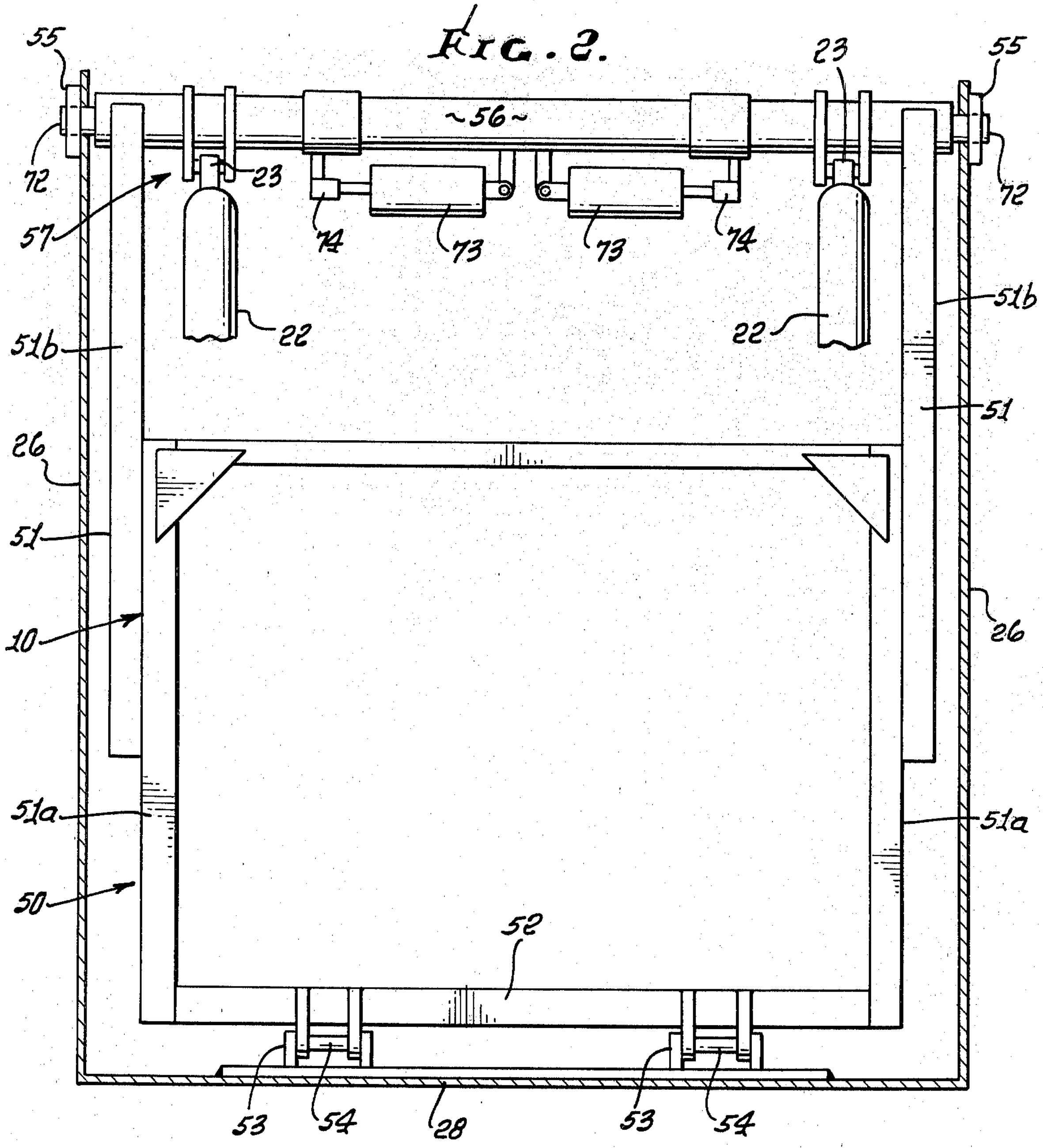
FIG. 2 is an elevational frontal view of a swingable frame means incorporated in the FIG. 1 apparatus.
Figure 3:
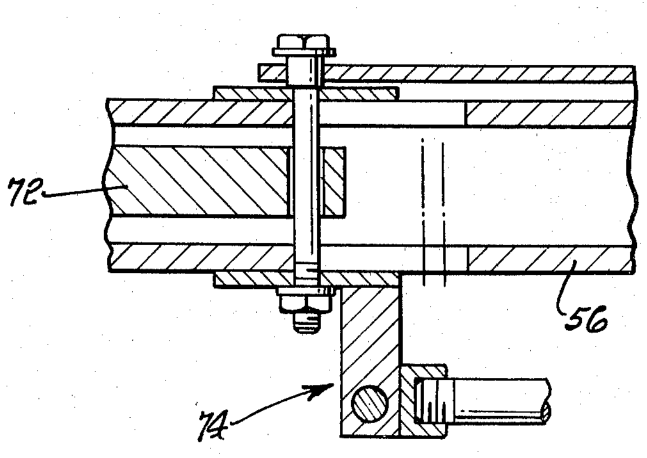
FIG. 3 is an enlarged section taken through mechanism to laterally advance and retract a pin, as appears in FIG. 2.

As shown in FIGS. 1 and 2, the swingable means advantageously may comprise an anchor frame 50 having laterally spaced upwardly extending arms 51 the lower ends of which are interconnected by a cross bar 52. The latter is pivotally connected at 53 to the floor 28, as via pins 54. The upper ends of the arms are intercentered as by cross shaft 56. Note that the arms include lower portions 51*a* and upper portions 51*b* extending at angles from the lower portion, so as to nest close to front wall 48*a*, as shown by broken lines 51*b*′. The cross shaft carries pivots 57 for the upper ends of two cylinders or actuators 22, as in clear in FIG. 2.

In operation, the frame 50 is first in retracted and locked position while the actuators push the blade or pusher to position 24′. Thereafter, the frame 50 is allowed to swing forwardly by operation of the cylinders acting to pivot the frame forwardly, to full position shown at 50. Following locking in that position, the frame is in condition to act as an anchor while the cylinders are again extended to push the blade to position 24*a*. Thereafter, contraction of the cylinders returns the blade to position 24′, and after unlocking of the frame 50, it is returnable to initial position adjacent front wall 48*a* by cylinder extension, and then locked to the receptacle. This is followed by cylinder retraction to displace the blade to fully retracted position.

To accomplish anchoring of the frame in retracted position, pins 72 in the ends of the cross shaft 56 are extended laterally by pneumatic cylinders 73 on that shaft and linkages 74, so that the pins enter retainers 55 on the walls 26. See FIG. 2 in this regard. To accomplish anchoring of the frame in extended position, the same pins 72 in the cross shaft ends are extended into retainers 56*a* (one of which appears in FIGS. 4–7) integral with walls 26. Each of the retainer 56*a* has a forward wall 77 which blocks pin displacement forwardly, during cylinder extension; also each retainer 56*a* has a rearward internal wall 58 which is angled as shown in FIGS. 4–6 to aid in release of refuse becoming entrapped in the recess defined by the retainer, and sloped bottom 158.

Figure 8:
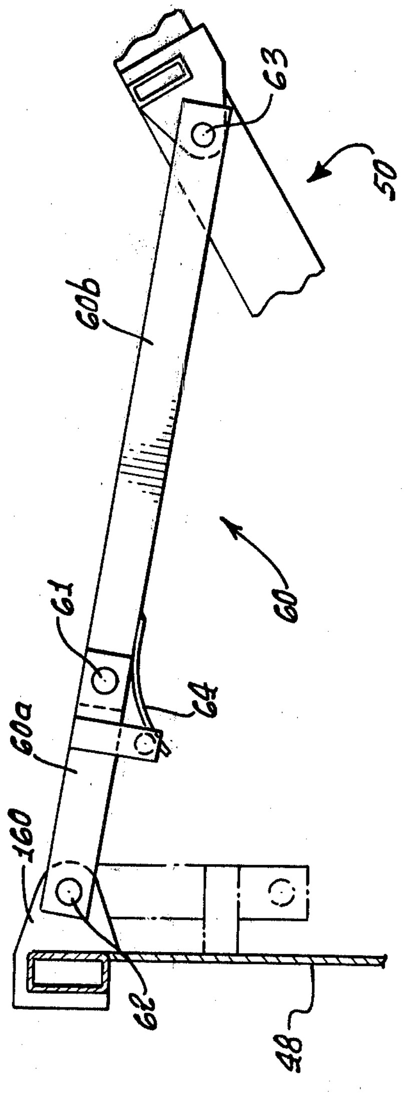
FIG. 8 is an enlarged fragmentary view showing biasing of an anchor arm associated with the swingable frame.

Also shown in FIGS. 1 and 8 is a scissors linkage 60 connected between each arm 50 and lug 160 on forward wall 48 (or fixed frame of the vehicle). Linkage 60 is fully extended in the second or rearwardly extended position of the frame 50, as is clear from FIG. 1, to hold the frame against further rearward swinging as during pull back of the blade. Note scissors links 60*a* and 60*b*, connected by pivot 61, and pivot connections 62 and 63. Yieldable means such as a flat spring 64 is carried by one link and biases the other link to tend to collapse the linkage, so as to assure such collapse when desired.

It will be noted in the above that pivoting of the anchor frame 50 prevents its binding to the walls of the receptacle.

I claim:

1. In a self-contained refuse handling and transporting apparatus that includes a truck chassis mounting an elongated, box-shaped receptacle having a refuse loading opening near the receptacle front and a normally closed refuse discharge opening at the receptacle rear, a pusher in said receptacle and an extensible actuator in the receptacle and operatively connected to the pusher to move it longitudinally to displace refuse toward said discharge opening, the improvement comprising:

(a) swingable means to which said actuator is also operatively connected for swinging its connection to the actuator from a first position relatively forwardly in the receptacle to a second position, closer to said discharge opening than said forward position, (b) whereby the actuator is extensible in said first position to move the pusher to a primary rearward position in the receptacle, and the actuator is extensible in said second position to move the pusher to a secondary rearward position in the receptacle, said secondary position located closer to said discharge opening than said primary position, (c) and holder means for releasably holding the swingable means in said second position while the actuator is being extended to move the pusher to said secondary position.

2. The improvement of claim 1 wherein said holder means includes interfitting elements carried by the swingable means and by the receptacle.

3. The improvement of claim 2 wherein said elements comprise a receiver on the receptacle, opening toward the interior of the receptacle, and a pin on said swingable means and movable into the receiver, and means to displace the pin into and out of the receiver.

4. The improvement of claim 3 wherein the receiver has a wall tapering longitudinally generally toward said discharge opening to release refuse becoming entrapped in said receiver.

5. The improvement of claim 1 wherein said swingable means includes at least one swinging arm, and a scissors linkage connected between said arm and a fixed frame part associated with the receptacle.

6. The improvement of claim 5 wherein the scissors linkage is substantially fully extended in said second position of the swingable arm, and including yieldable means biasing said extended scissors linkage toward partially collapsed condition.

7. The improvement of claim 6 including means anchoring said swingable means to swing between said first and second positions.

8. The improvement of claim 1 wherein said swingable means includes two swingable arms, and a cross shaft extending therebetween, the holder means being adapted to releasably hold the arms and cross shaft in fixed position relative to the receptacle in each of said first and second positions.

9. The improvement of claim 8 wherein said holder means comprises at least one pin on the cross shaft, and retainers on the receptacle forming recesses to receive the pin in said first and second positions.

10. The improvement of claim 9 wherein one retainer has a first wall to block pin displacement forwardly during actuator extension, and a second wall angled to release entrapped refuse in a rearward direction.

* * * * *